US008861008B2

(12) United States Patent
Miyabe

(10) Patent No.: US 8,861,008 B2
(45) Date of Patent: Oct. 14, 2014

(54) BIDIRECTIONAL COMMUNICATION TECHNIQUE BETWEEN AN INFORMATION PROCESSING APPARATUS AND AN IMAGE PROCESSING APPARATUS

(71) Applicant: Kazuhiro Miyabe, Kanagawa (JP)

(72) Inventor: Kazuhiro Miyabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/909,211

(22) Filed: Jun. 4, 2013

(65) Prior Publication Data
US 2014/0009774 A1 Jan. 9, 2014

(30) Foreign Application Priority Data

Jul. 9, 2012 (JP) .................................. 2012-153979
Apr. 10, 2013 (JP) .................................. 2013-081907

(51) Int. Cl.
G06F 3/12 (2006.01)
H04L 29/06 (2006.01)

(52) U.S. Cl.
CPC ............ *G06F 3/1298* (2013.01); *G06F 3/1229* (2013.01); *G06F 3/1288* (2013.01); *G06F 3/1293* (2013.01); *G06F 3/1209* (2013.01); *H04L 63/20* (2013.01); *G06F 3/1204* (2013.01)
USPC ........................................................ 358/1.15

(58) Field of Classification Search
CPC ... G06F 3/1231; G06F 3/1229; G06F 3/1285; G06F 3/1236; G06F 3/1286; G06F 3/1232
USPC ......................................................... 358/1.15
See application file for complete search history.

(56) References Cited

U.S. PATENT DOCUMENTS

| 6,976,084 | B2 * | 12/2005 | Pineau et al. ................. 709/232 |
| 2008/0291483 | A1 | 11/2008 | Shimatani |
| 2008/0301267 | A1 * | 12/2008 | Chang et al. .................. 709/220 |
| 2010/0046436 | A1 * | 2/2010 | Doviak et al. ................. 370/328 |
| 2011/0149342 | A1 * | 6/2011 | Tsujii ........................... 358/1.15 |
| 2012/0236346 | A1 | 9/2012 | Miyabe |

FOREIGN PATENT DOCUMENTS

JP 2006-079138 3/2006

* cited by examiner

*Primary Examiner* — Eric A Rust
(74) *Attorney, Agent, or Firm* — Harness, Dickey & Pierce, P.L.C.

(57) ABSTRACT

A print processing system includes a bidirectional communication part that carries out bidirectional communication with an information processing apparatus and an image processing apparatus; a command generation part that generates, based on a request received by the bidirectional communication part from the information processing apparatus, a request command to be transmitted to the image processing apparatus, depending on a print protocol of the image processing apparatus; and a response conversion part that converts a response that corresponds to the request command and has been received by the bidirectional communication part from the image processing apparatus, into a response that is to be transmitted to the information processing apparatus, and has a form that does not depend on print protocols.

3 Claims, 17 Drawing Sheets

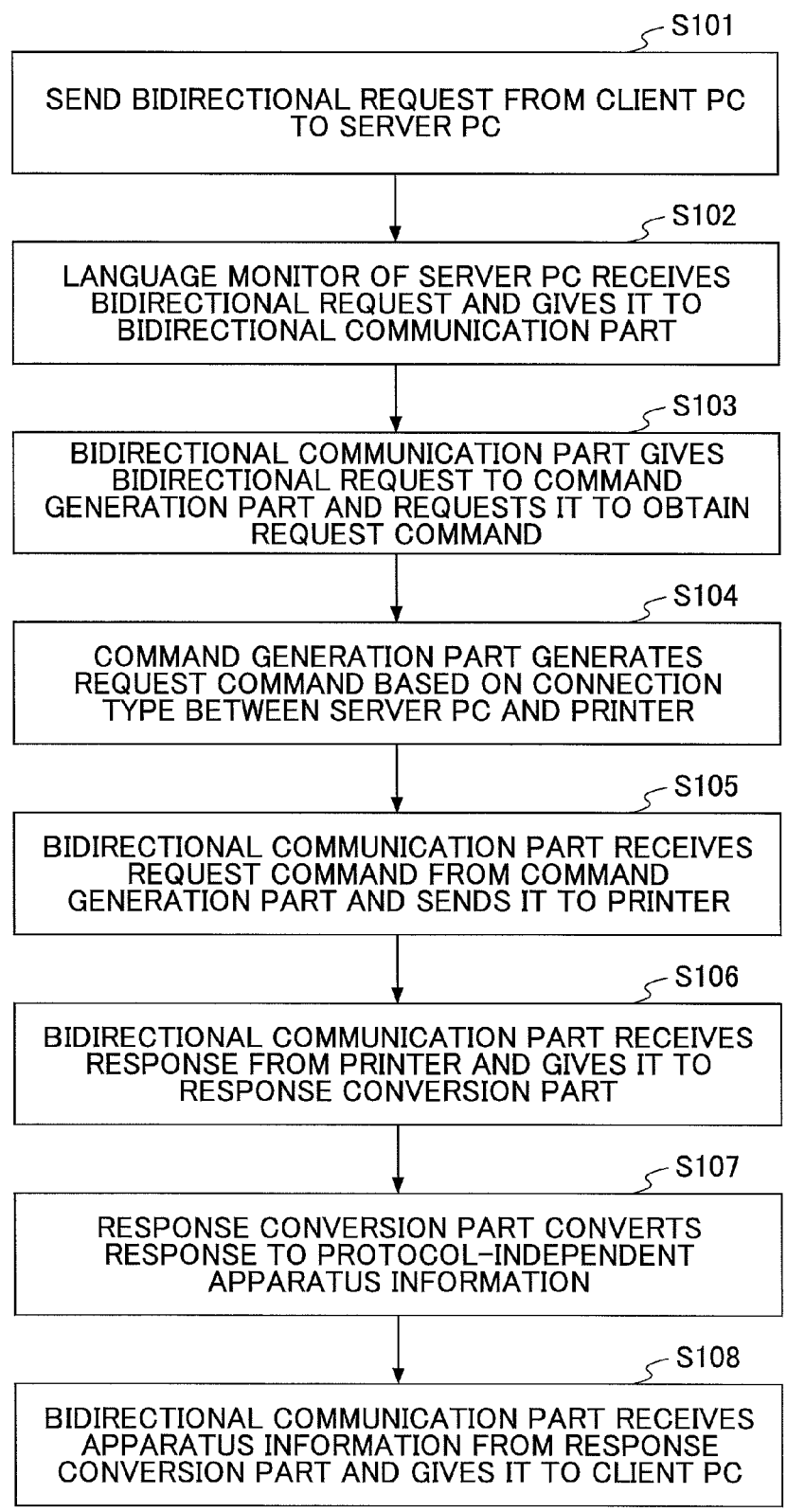

FIG.7

SendRecvBidiDataFromPort

The SendRecvBidiDataFromPort function, which can be implemented in either a language monitor server DLL or a port monitor server DLL, supports bidirectional communication between an application and a printer or print server.

```
DWORD WINAPI
    SendRecvBidiDataFromPort(
        HANDLE   hPort,
        DWORD    dvAccessBit,
        LPCWSTR  pAction,
        PBIDI_REQUEST_CONTAINER   pReqData,
        PBIDI_RESPONSE_CONTAINER  7ppResData
    );
```

FIG.8A

| BIDIRECTIONAL REQUEST | REQUEST COMMAND |
|---|---|
| OPTION | @PJL INFO CONFIG |
| MEMORYSIZE | @PJL INFO MEMORY |

FIG.8B

| BIDIRECTIONAL REQUEST | REQUEST COMMAND |
|---|---|
| OPTION | 1.3.6.1.2.1.43.1325.1 |
| MEMORYSIZE | 1.3.6.1.2.1.43.136546.0 |

FIG.9A
BIDIRECTIONAL REQUEST
| OPTION |
|---|
REQUEST COMMAND
| @PJL INFO CONFIG |
|---|
RESPONSE
| @PJL INFO CONFIG<br>DUPLEX [1<br>ENUMERATED]<br>　　　　　DUPLEX |
|---|
APPARATUS INFORMATION
| DUPLEX=ON |
|---|
FIG.9B
BIDIRECTIONAL REQUEST
| OPTION |
|---|
REQUEST COMMAND
| 1.3.6.1.2.1.43.1325.1 |
|---|
RESPONSE
| duplex |
|---|
APPARATUS INFORMATION
| DUPLEX=ON |
|---|

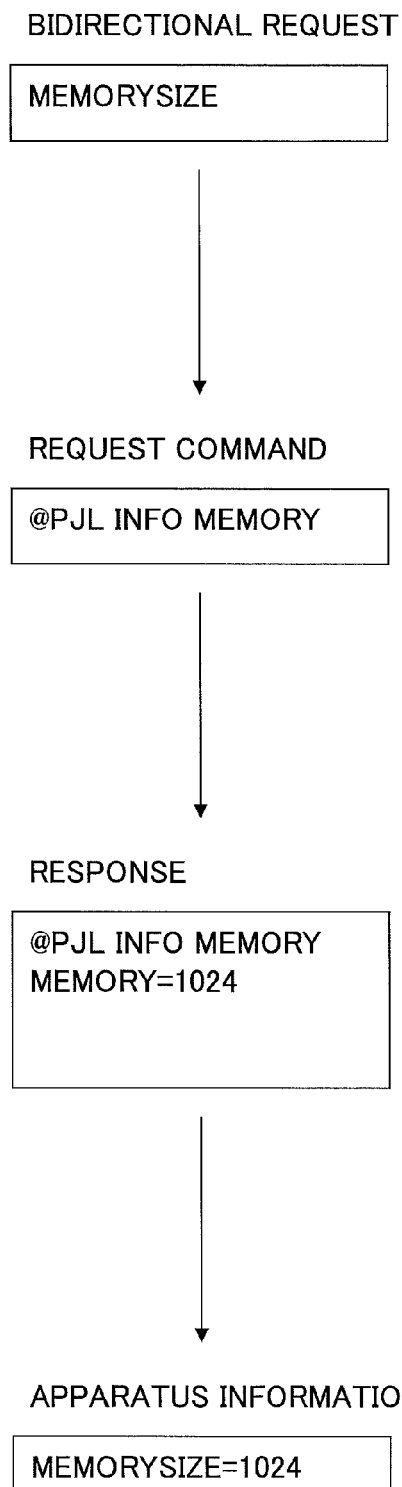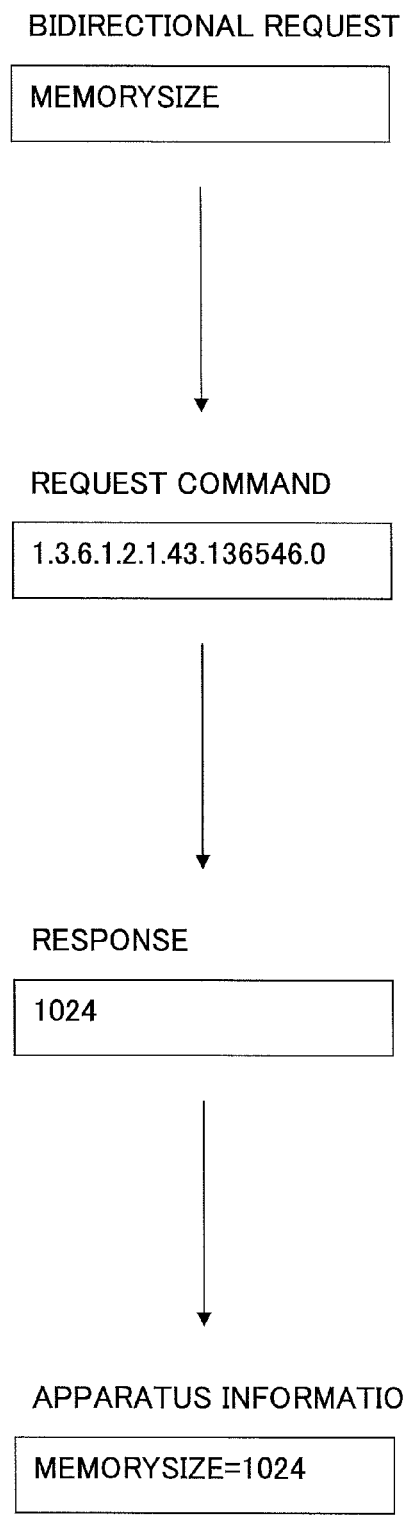

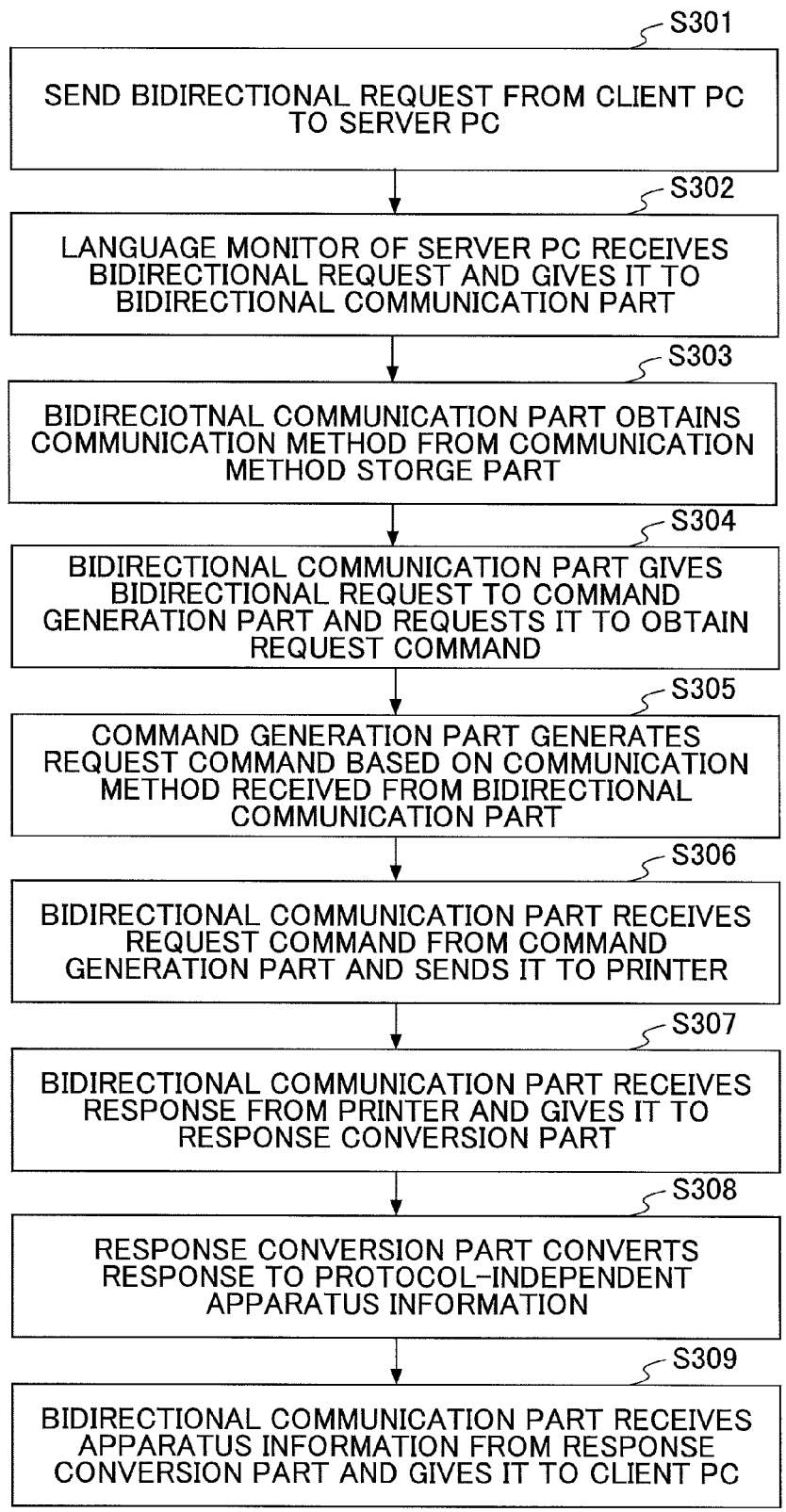

BIDIRECTIONAL COMMUNICATION TECHNIQUE BETWEEN AN INFORMATION PROCESSING APPARATUS AND AN IMAGE PROCESSING APPARATUS

BACKGROUND OF THE INVENTION

1. Field of the Invention

The present invention relates to a technique of print processing.

2. Description of the Related Art

A technique called "Point & Print" is known. In this technique, a shared printer of a server personal computer (server PC) is designated from a client personal computer (client PC), and thus, a printer driver is copied and installed in the client PC from the server PC. As a result, the client PC does not need to individually install the printer driver.

Further, a technique is known in which, bidirectional communication is carried out between a printer driver and a printer, and thereby, the printer driver obtains apparatus information of the printer.

FIG. 1 illustrates one example of bidirectional communication carried out at a time of carrying out the Point & Print technology.

In FIG. 1, a client PC 1 is placed in a network #1, a server PC 2 is placed in a network #2 and a printer 3 is placed in a network #3. Further, in this case, for an administrative reason, the client PC 1 in the network #1 and the printer 3 in the network #3 are not allowed to carry out communication directly therebetween. That is, in this case, direct communication between the client PC 1 in the network #1 and the printer 3 in the network #3 is restricted.

In such an environment, from the client PC 1 in the network #1, only the server PC 2 in the network #2 can be seen, and it is not possible to know the existence of the printer 3 in the network #3.

Therefore, the client PC 1 cannot obtain apparatus information of the printer 3 by directly carrying out bidirectional communication with the printer 3 using a protocol such as a simple network management protocol (SNMP).

Further, a technique is known (see Japanese Laid-Open Patent Application No. 2006-079138, for example), by which, the client PC 1 carries out bidirectional communication with the printer 3 via the server PC 2. However, bidirectional communication cannot be carried out without depending on the connection type (TCP/IP ports, USB ports, WSD ports or the like) between the server PC 2 and the printer 3.

That is, according to bidirectional communication in the related art, the client PC 1 cannot directly obtain apparatus information of the printer 3, and also, cannot obtain apparatus information of the printer 3 without depending on the connection type, in a case where direct communication between the client PC 1 and the printer 3 is restricted in a Point & Print environment.

FIG. 2 shows another example of bidirectional communication carried out at a time of carrying out the Point & Print technology. In this case, the client PC 1 in the network #1 and the printer 3 in the network #3 are allowed to directly carry out communication with one another.

In this case, when bidirectional communication is carried out between the client PC 1 and the printer 3 via the server PC 2, a network load is applied to the server PC 2 accordingly. Therefore, it is preferable that the client PC 1 and the printer 3 carry out bidirectional communication directly.

However, in many cases, for an administrative reason, a setting is made to the client PC 1 such that communication is to be carried out via the server PC 2. A user of the client PC 1 cannot change the setting if the user does not have the corresponding authority, and thus, it may be difficult to directly carry out bidirectional communication between the client PC 1 and the printer 3.

SUMMARY OF THE INVENTION

According to one embodiment of the present invention, a print processing system includes a bidirectional communication part that carries out bidirectional communication with an information processing apparatus and an image processing apparatus; a command generation part that generates, based on a request received by the bidirectional communication part from the information processing apparatus, a request command to be transmitted to the image processing apparatus, depending on a print protocol of the image processing apparatus; and a response conversion part that converts a response that corresponds to the request command and has been received by the bidirectional communication part from the image processing apparatus, into a response that is to be transmitted to the information processing apparatus and has a form that does not depend on print protocols.

Other objects, features and advantages of the present invention will become more apparent from the following detailed description when read in conjunction with the accompanying drawings.

BRIEF DESCRIPTION OF THE DRAWINGS

FIG. 6 is a flowchart showing a processing example of the first embodiment;

FIG. 7 shows an example of a function to be used for transmitting a bidirectional request to a language monitor;

FIGS. 8A and 8B show examples of correspondences between a bidirectional request and a request command;

FIGS. 9A and 9B show examples of a flow from transmitting a bidirectional request for obtaining apparatus information;

FIGS. 10A and 10B show other examples of a flow from transmitting a bidirectional request for obtaining apparatus information;

FIG. 16 is a flowchart showing a processing example of the third embodiment.

DETAILED DESCRIPTION OF THE EMBODIMENTS

Below, the preferable embodiments of the present invention will be described.

The following is purposes of the embodiments:

Even in a case where direct communication between a client PC and a printer is restricted, the client PC can obtain apparatus information of the printer without regard to the connection type between a server PC and the printer.

In a case where direct communication between the client PC and the printer is allowed to carry out, it is possible to actually carry out direct communication between the client PC and the printer.

First Embodiment

Figure 1:
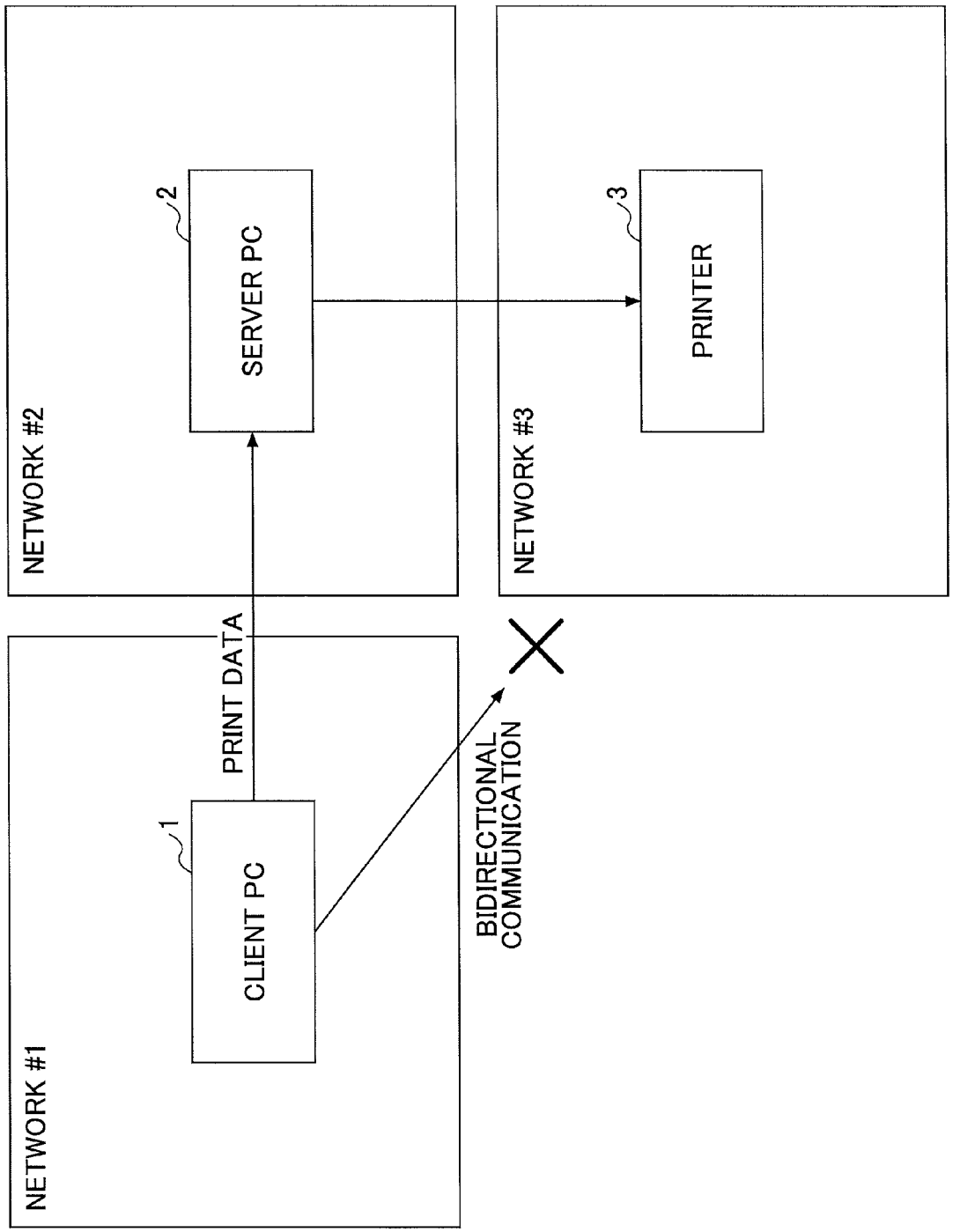
FIG. 1 illustrates one example of bidirectional communication at a time of carrying out the Point & Print technology (in a case where direct communication between a client PC and a printer are not allowed to carry out)
Figure 2:
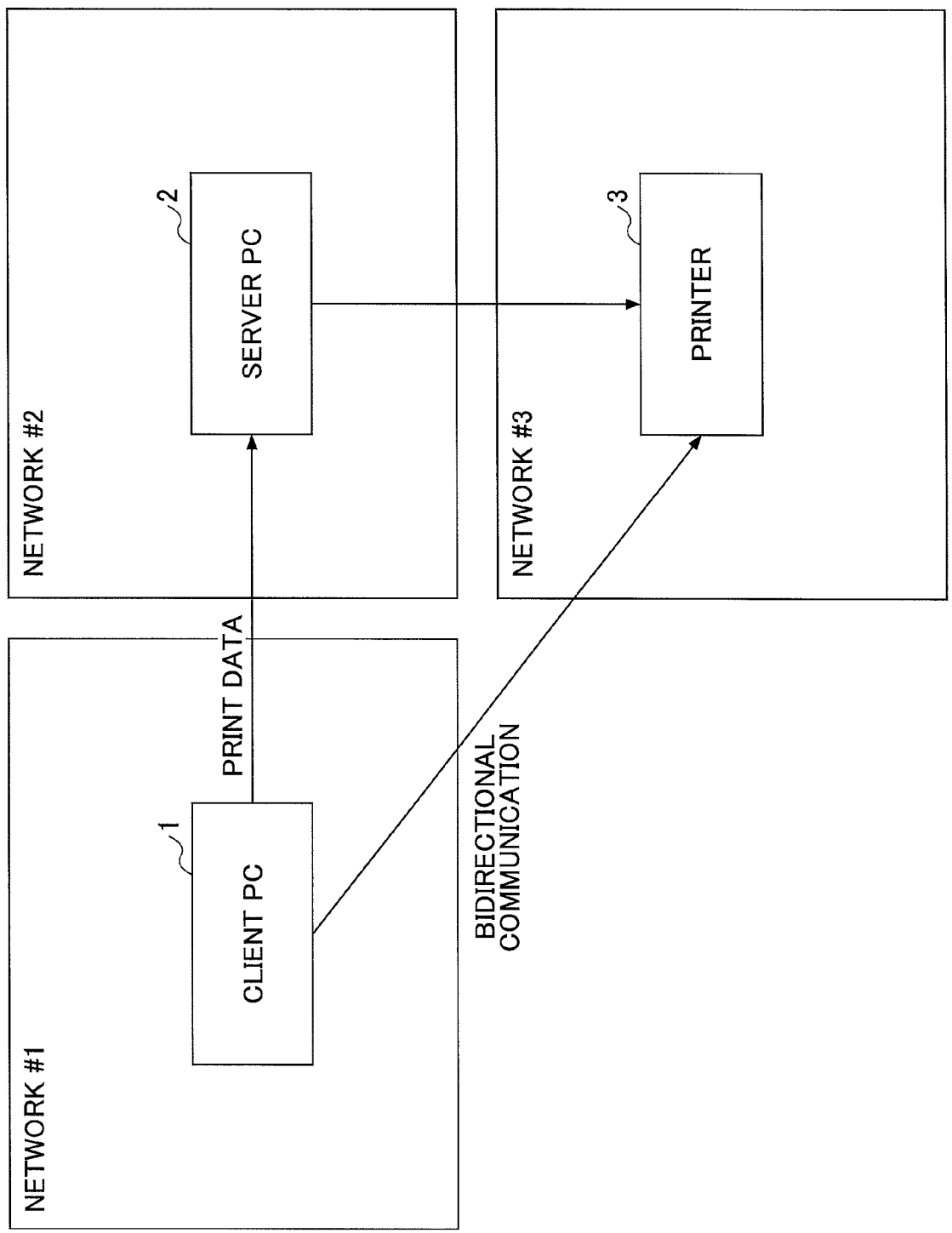
FIG. 2 illustrates one example of bidirectional communication at a time of carrying out the Point & Print technology (in a case where direct communication between the client PC and the printer are allowed to carry out)
Figure 3:
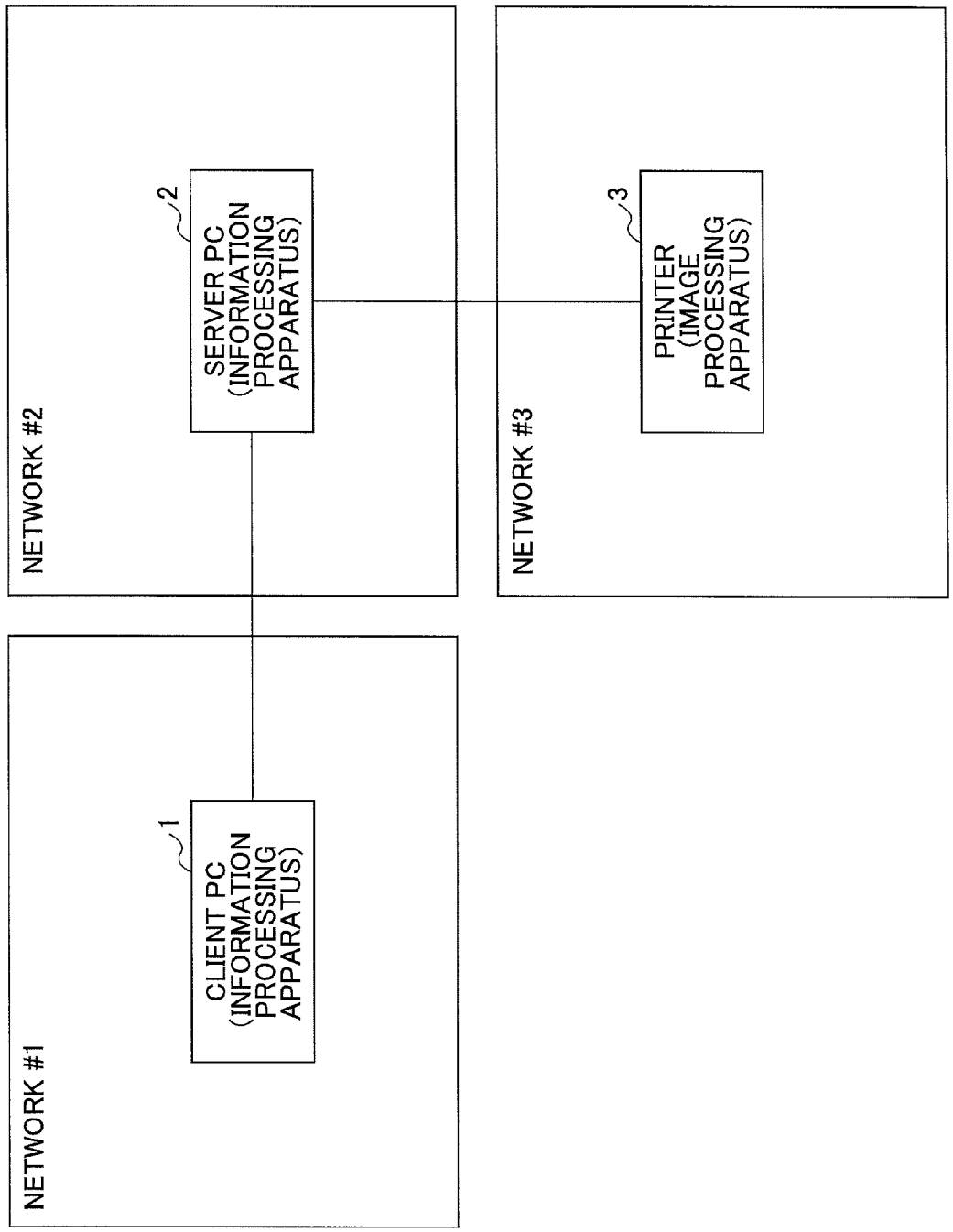
FIG. 3 shows a configuration example of a system according to a first embodiment.

FIG. 3 shows a system configuration example according to a first embodiment.

In FIG. 3, a client PC (information processing apparatus) 1 placed in a network #1 is connected with a server PC (information processing apparatus) 2 placed in a network #2. The server PC 2 is connected with a printer (image processing apparatus) 3 placed in a network #3.

Figure 4:
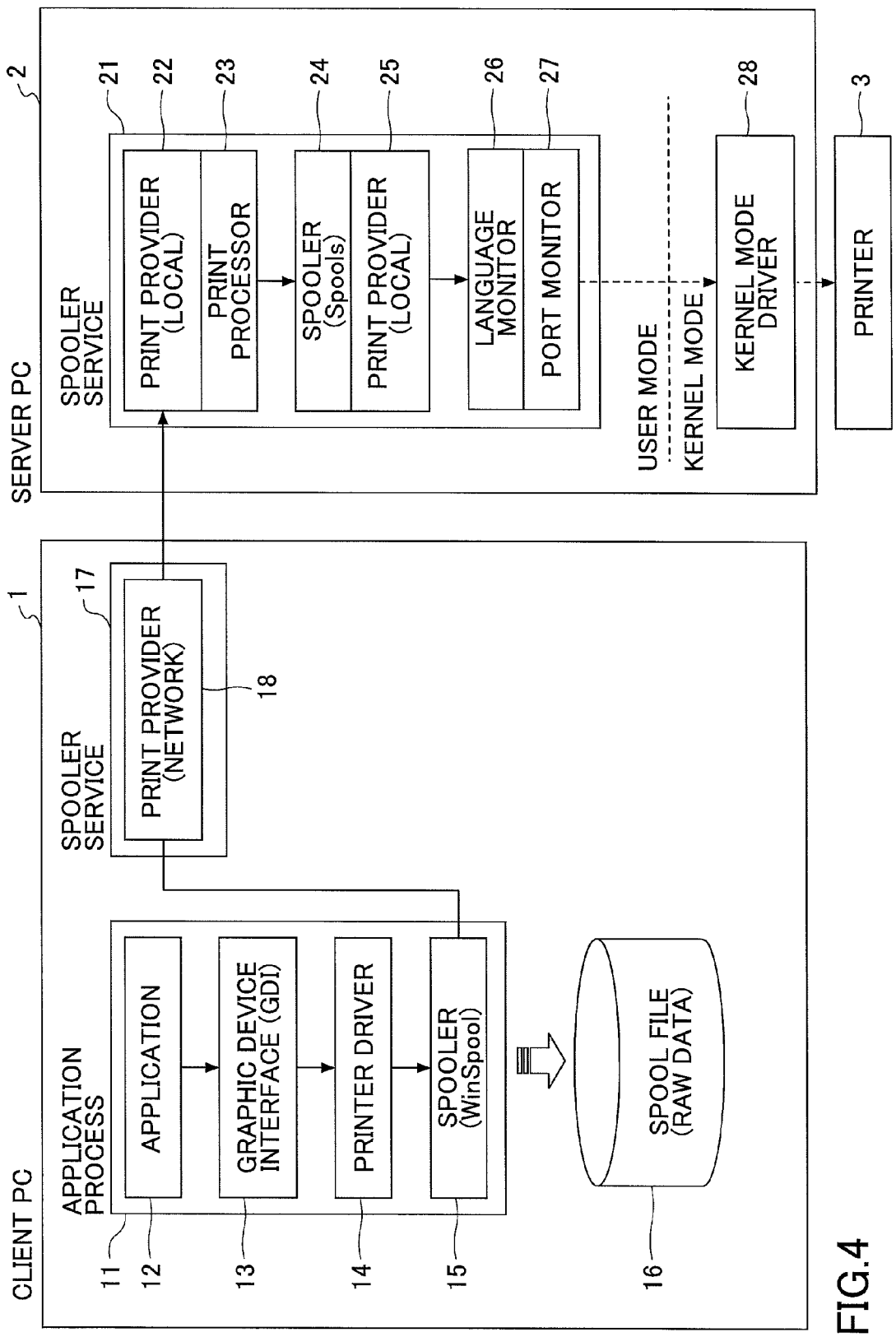
FIG. 4 shows one example of print architecture at a time of carrying out the Point & Print technology.

FIG. 4 shows one example of print architecture at a time of carrying out Point & Print technology.

In FIG. 4, when print is executed from an application 12 in an application process 11 of the client PC 1, print data is received by a printer driver 14 via a graphic device interface 13. The printer driver 14 transmits the print data to a spooler service 17 (print provider 18) of the client PC 1 while storing the print data in a spooler file 16 via a spooler 15.

The spooler service 17 of the client PC 1 transmits the received print data to a spooler service 21 of the server PC 2.

The spooler service 21 of the server PC 2 transmits the received print data to the printer 3 via a print provider 22, a print processor 23, a spooler 24, a print provider 25, a language monitor 26, a port monitor 27 and a kernel mode driver 28.

The language monitor 26 is one provided by a Windows (registered trademark) OS in a normal situation, but a vendor may use a language monitor 26 which has been customized after replacing the original one therewith. Thereby, it is possible to include a function(s) unique to the vendor in the language monitor 26.

Figure 5A:
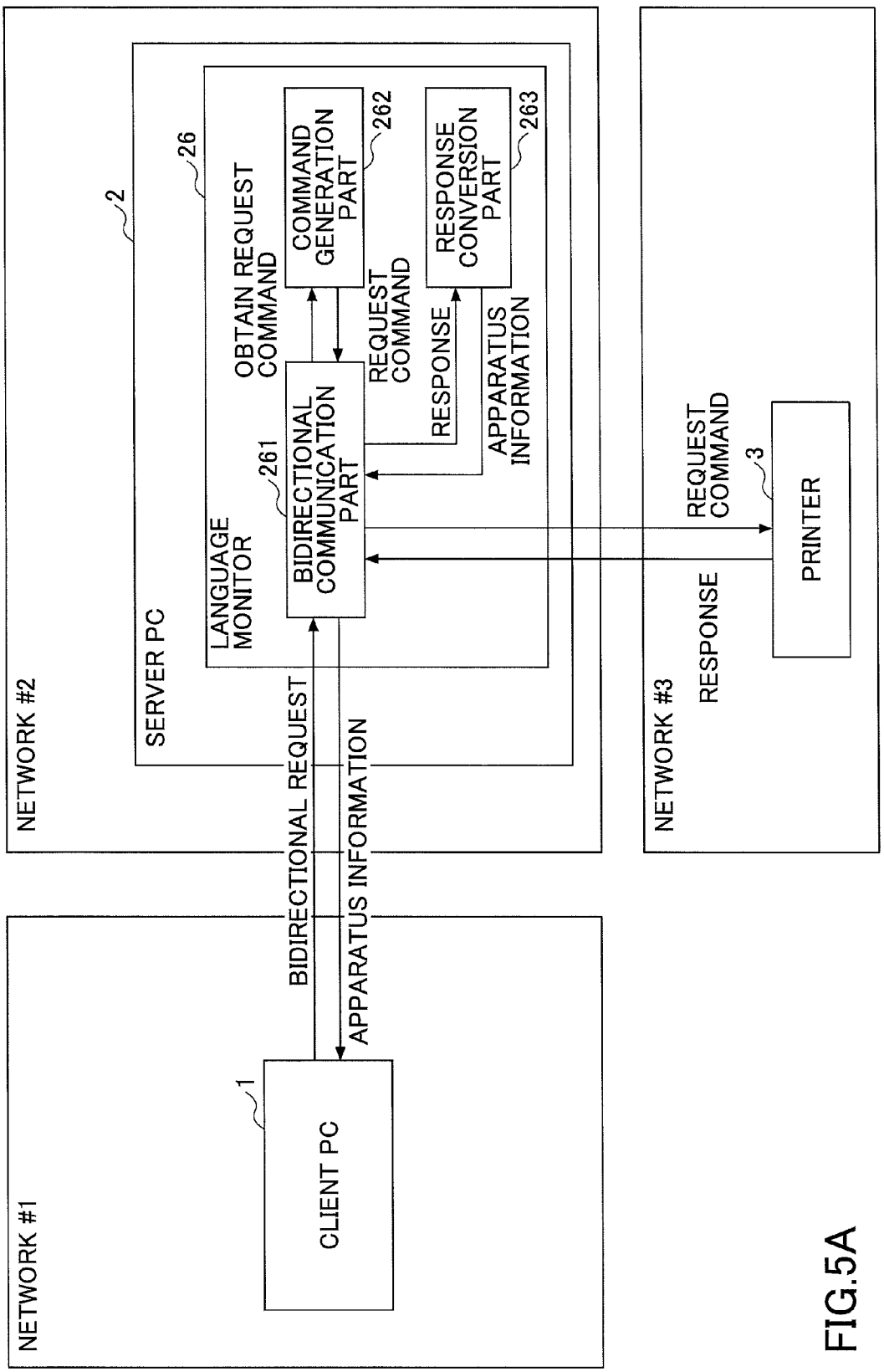
FIG. 5A shows a functional configuration example for bidirectional communication according to the first embodiment.

FIG. 5A shows a functional configuration example for bidirectional communication according to the first embodiment.

In FIG. 5A, the server PC 2 includes a bidirectional communication part 261, a command generation part 262 and a response conversion part 263 in the language monitor 26.

Figure 5B:
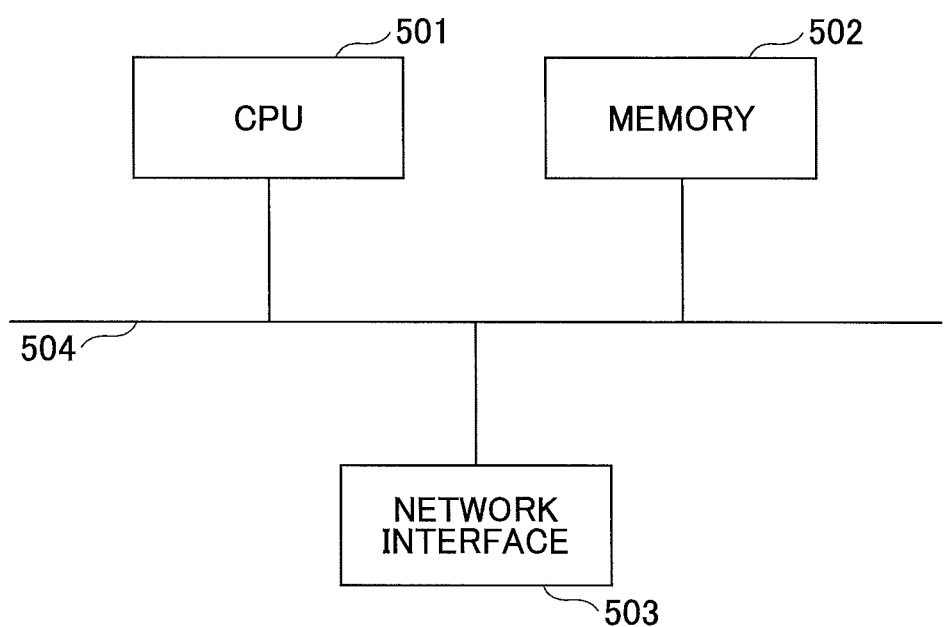
FIG. 5B illustrates a hardware configuration example of a client PC according to the first embodiment.

FIG. 5B shows a hardware configuration example of the server PC 2.

As shown in FIG. 5B, the server PC 1 includes a CPU 501, a memory 502 and a network interface 503, which are connected together by a bus 504.

The CPU 501 reads and executes a driver program stored in a memory 502, and thus, carries out processing so that the above-mentioned bidirectional communication part 261, command generation part 262 and response conversion part 263 can be realized.

The network interface 503 is one with which the server PC 2 can communicate with the client PC 1 or the printer 3 via networks #1 and #2 or the networks #3 and #2.

FIG. 6 is a flowchart showing a processing example of the first embodiment.

In FIG. 6, in a case where there occurs a necessity of obtaining apparatus information of the printer 3, the client PC 1 transmits a bidirectional request to the language monitor 26 of the server PC 2 (step S101).

When having received the bidirectional request, the language monitor 26 of the server PC 2 gives it to the bidirectional communication part 261 (step S102).

The bidirectional communication part 261 gives the bidirectional request to the command generation part 262, and requests it to obtain a request command (step S103).

The command generation part 262 generates a request command based on the connection type between the server PC 2 and the printer 3, and gives the request command to the bidirectional communication part 261 (step S104). The request command to be transmitted to the printer 3 and the communication method depend on the connection type between the server PC 2 and the printer 3. For example, a SNMP protocol is used when the connection is made using TCP/IP ports. PJL is used when the connection is made using USB ports. The command generation part 262 generates the suitable request command depending on the type of the port.

The bidirectional communication part 261 receives the request command from the command generation part 262, transmits the request command to the printer 3, and starts bidirectional communication (step S105).

The bidirectional communication part 261 receives a response from the printer 3, and gives it to the response conversion part 263 (step S106).

The response conversion part 263 converts the response to apparatus information that does not depend on protocols (step S107). As mentioned above, the request command depends on the communication protocol between the server PC 2 and the printer 3. In the same way, the response from the printer 3 also depends on the protocol. The response conversion part 263 converts the response to apparatus information that does not depend on protocols.

The bidirectional communication part 261 receives the apparatus information from the response conversion part 263 and gives it to the client PC 1 (step S108).

FIG. 7 shows one example of a function that is used to transmit the bidirectional request to the language monitor 26.

In the language monitor 26, an interface that is determined by the OS exists. Detailed explanation is described in a MSDN document (http://msdn.microsoft.com/en-us/library/ms123401).

Here, by using an interface named SendRecvBidiDataFromPort( ) a module that has called the language monitor 26 can give data to and receive data from the language monitor 26. According to the first embodiment, by using this function, data is given to and received from between the client PC 1 and the language monitor 26 of the server PC 2.

FIGS. 8A and 8B show examples of correspondences between bidirectional requests and request commands.

As examples of bidirectional request, there are, for example, "OPTION" for obtaining option information of a printer and "MEMORYSIZE" for obtaining a memory size of a printer. That is, in order to obtain option information of the printer 3, an "OPTION" request is transmitted from the client PC 1 to the server PC 2. In the same way, in order to obtain a memory size of the printer 3, a "MEMORYSIZE" request is transmitted from the client PC 1 to the server PC 2.

FIG. 8A shows correspondence relationships between bidirectional requests and request commands for a case where the server PC 2 and the printer 3 are connected via USB ports, and communication is carried out using PJL. That is, when a bidirectional request "OPTION" is given to the command generation part 262, the command generation part 262 generates a request command "@PJL INFO CONFIG". In the same way, when a bidirectional request "MEMORYSIZE" is given to a command generation part 262, the command generation part 262 generates a request command "@PJL INFO MEMORY".

FIG. 8B shows correspondence relationships between bidirectional requests and request commands for a case where the server PC 2 and the printer 3 are connected via TCP/IP ports, and communication is carried out using SNMP. That is, when a bidirectional request "OPTION" is given to the command generation part 262, a command generation part 262 generates a request command "1.3.6.1.2.1.43.1325.1". In the same way, when a bidirectional request "MEMORYSIZE" is given to the command generation part 262, the command generation part 262 generates a request command "1.3.6.1.2.1.43.136546.0".

FIGS. 9A and 9B and FIGS. 10A and 10B show examples of flows from transmitting a bidirectional request for obtaining apparatus information.

FIGS. 9A and 9B shows cases where a bidirectional request is "OPTION". FIG. 9A shows a case where communication is carried out by PJL. FIG. 9B shows a case where communication is carried out by SNMP.

In FIG. 9A, when a bidirectional request "OPTION" has been transmitted from the client PC 1 to the server PC 2, the server PC 2 generates a request command "@PJL INFO CONFIG" in a case of carrying out communication by PJL, and transmits the generated request command to the printer 3.

From the printer 3, a response "@PJL INFO CONFIG DUPLEX [1 ENUMERATED] DUPLEX" is transmitted to the server PC 2. The server PC 2 converts the response into apparatus information "DUPLEX=ON" that does not depend on protocols, and transmits the apparatus information to the client PC 1.

The response conversion part 263 of the server PC 2 converts a response of PJL into "DUPLEX=ON" as apparatus information when, for example, "DUPLEX" is included in a response of PJL.

In FIG. 9B, when a bidirectional request "OPTION" has been transmitted from the client PC 1 to the server PC 2, the server PC 2 generates a request command "1.3.6.1.2.1.43.1325.1" in a case of carrying out communication by SNMP, and transmits the generated request command to the printer 3.

From the printer 3, a response "duplex" is transmitted to the server PC 2. The server PC 2 converts the response into apparatus information "DUPLEX=ON" that does not depend on protocols, and transmits the apparatus information to the client PC 1.

The response conversion part 263 of the server PC 2 thus converts a response of SNMP into "DUPLEX=ON" as apparatus information when, for example, "duplex" is included in a response of SNMP.

In FIG. 10A, when a bidirectional request "MEMORYSIZE" has been transmitted from the client PC 1 to the server PC 2, the server PC 2 generates a request command "@PJL INFO MEMORY" in a case of carrying out communication by PJL, and transmits the generated request command to the printer 3.

From the printer 3, a response "@PJL INFO MEMORY MEMORY=1024" is transmitted to the server PC 2. The server PC 2 converts the response into apparatus information "MEMORYSIZE=1024" that does not depend on protocols, and transmits the apparatus information to the client PC 1.

In FIG. 10B, when a bidirectional request "MEMORYSIZE" has been transmitted from the client PC 1 to the server PC 2, the server PC 2 generates a request command "1.3.6.1.2.1.43.136546.0" in a case of carrying out communication by SNMP, and transmits the generated request command to the printer 3.

From the printer 3, a response "1024" is transmitted to the server PC 2. The server PC 2 converts the response into apparatus information "MEMORYSIZE=1024" that does not depend on protocols, and transmits the apparatus information to the client PC 1.

Thus, according to the first embodiment, the client PC 1 transmits a bidirectional request that does not depend on connection types between the server PC 2 and the printer 3, and a response from the printer 3 is converted into apparatus information that does not depend on protocols and is given to the client PC 1. Thus, the client PC 1 can obtain the apparatus information without regard to the connection type between the server PC 2 and the printer 3.

Second Embodiment

Figure 11:
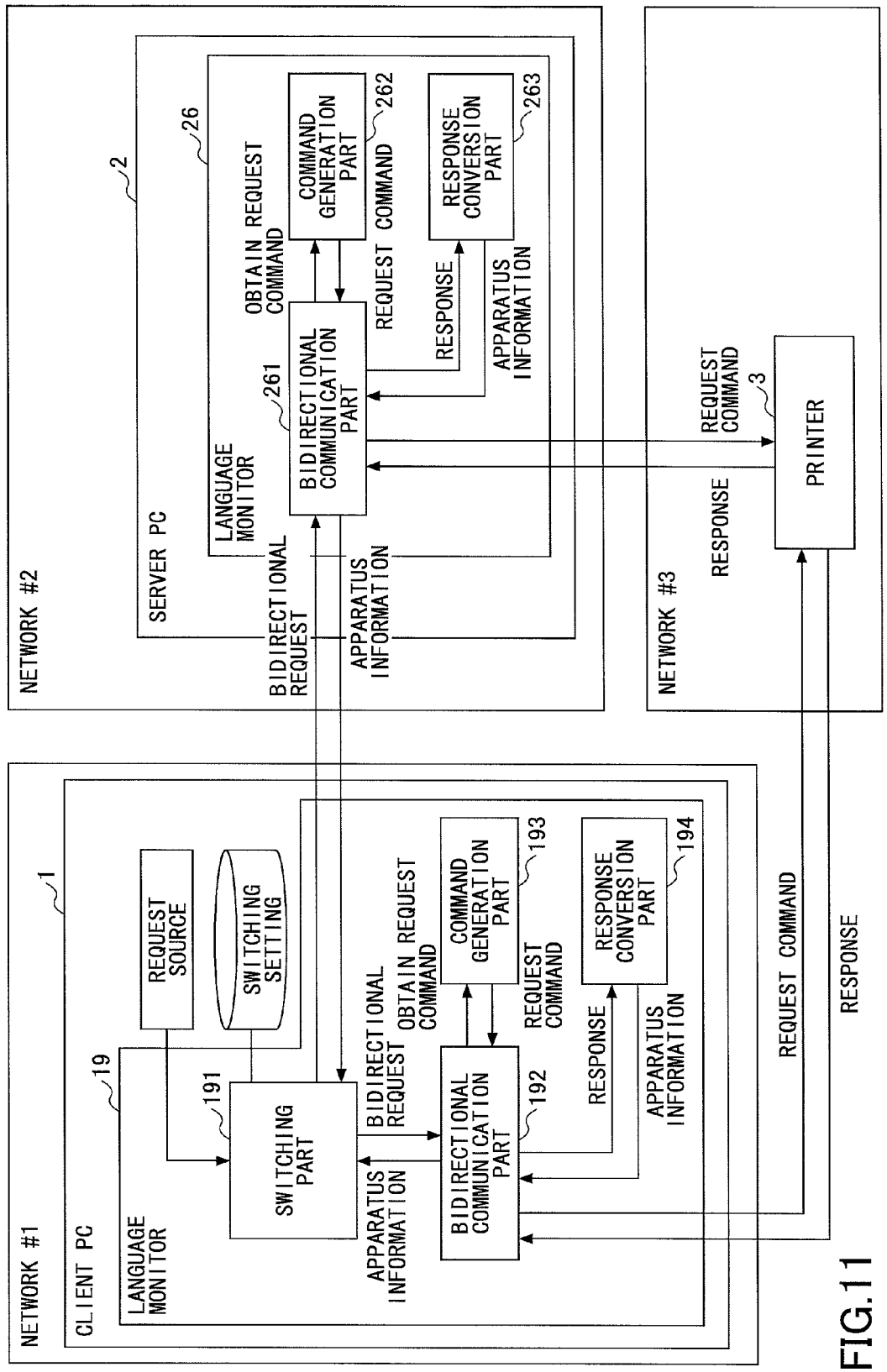
FIG. 11 shows a functional configuration example for bidirectional communication according to a second embodiment.

FIG. 11 shows a functional configuration example for carrying out bidirectional communication according to a second embodiment.

In an environment of communication between the client PC 1 and the printer 3 directly being allowed to carry out, it is preferable to be able to actually carry out communication directly between the client PC 1 and the printer 3 since a network load is applied to the server PC 2 when carrying out bidirectional communication between the client PC 1 and the printer 3 via the server PC 2. According to the second embodiment, a user can carry out switching as to whether to carry out bidirectional communication via the server PC 2 or carry out bidirectional communication directly between the client PC 1 and the printer 3.

In FIG. 11, in addition to the configuration of FIG. 5, the client PC 1 has a language monitor 19 which includes a switching part 191, a bidirectional communication part 192, a command generation part 193 and a response conversion part 194. It is noted that the language monitor 19 of the client PC 1 is one provided in cooperation with the language monitor 26 of the server PC 2, depending on a Point & Print environment mentioned above.

Figure 12:
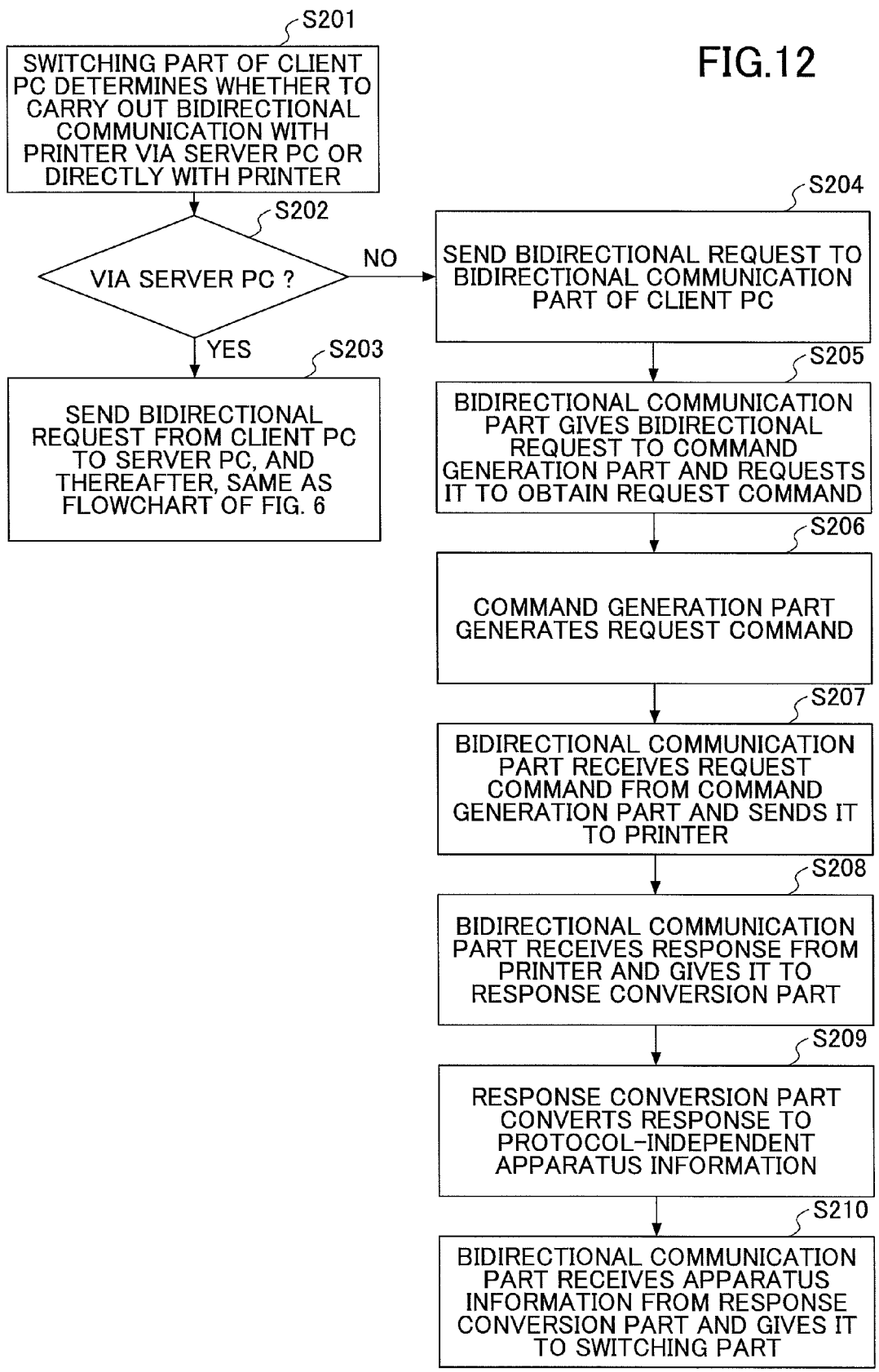
FIG. 12 is a flowchart showing a processing example of the second embodiment.

FIG. 12 is a flowchart showing a processing example of the second embodiment.

In FIG. 12, in a case where there occurs a necessity of obtaining apparatus information of the printer 3, the switching part 191 of the language monitor 19 of the client PC 1 determines whether to carry out bidirectional communication with the printer 3 via the server PC 1 or carry out bidirectional communication with the printer 3 directly, based on a switching setting (step S201).

Figure 13:
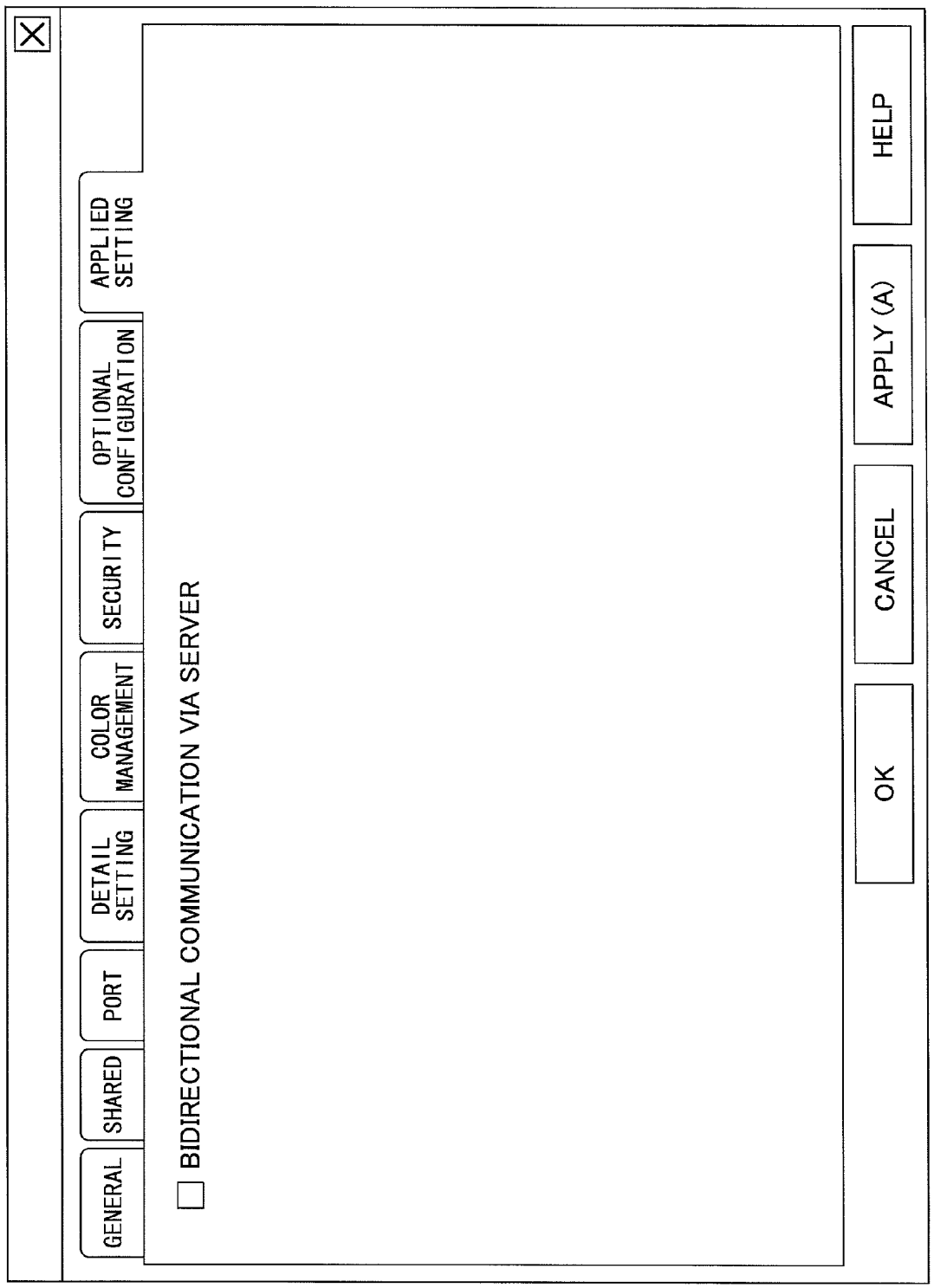
FIG. 13 shows one example of a user interface for a switching setting concerning bidirectional communication.

The switching setting is previously made by a user through a user interface such as that shown in FIG. 13. That is, as a result of a check mark being used to designate "bidirectional communication via server" on a screen page such as that shown in FIG. 13 through an operation made by the user to the client PC 1, the setting of carrying out bidirectional communication via the server PC 2 is stored. On the other hand, as a result of the check mark being removed from "bidirectional communication via server" on the screen page through an operation made by the user to the client PC 1, the setting of carrying out bidirectional communication directly is stored. The switching setting may be stored in a predetermined registry.

Returning to FIG. 12, in the case of carrying out bidirectional communication via the server PC 2 (step S202 YES), the same processing as that of FIG. 6 is carried out (step S203). It is noted that bidirectional communication via the server PC 2 is also carried out in a case where bidirectional communication that has been carried out directly between the client PC 1 and the printer 3 without using the server PC 2 has resulted in failure.

In the case of not using the server PC 2 (i.e., carrying out direct communication) (step S202 NO), the switching part 191 of the client PC 1 transmits a bidirectional request to the bidirectional communication part 192 (step S204).

The bidirectional communication part 192 gives the bidirectional request to the command generation part 193, and requests it to obtain a request command (step S205).

The command generation part 193 generates a request command according to the connection type between the client PC 1 and the printer 3, and gives the request command to the bidirectional communication part 192 (step S206).

The bidirectional communication part 192 receives the request command from the command generation part 193, and transmits the request command to the printer 3 (step S207).

The bidirectional communication part 192 then receives a response from the printer 3, and gives it to the response conversion part 194 (step S208).

The response conversion part 194 converts the response to apparatus information that does not depend on protocols, and gives it to the bidirectional communication part 192 (step S209).

The bidirectional communication part 191 receives the apparatus information from the response conversion part 194 and gives it to the switching part 191, and the switching part 191 gives it to the request source (step S210).

Third Embodiment

Figure 14:
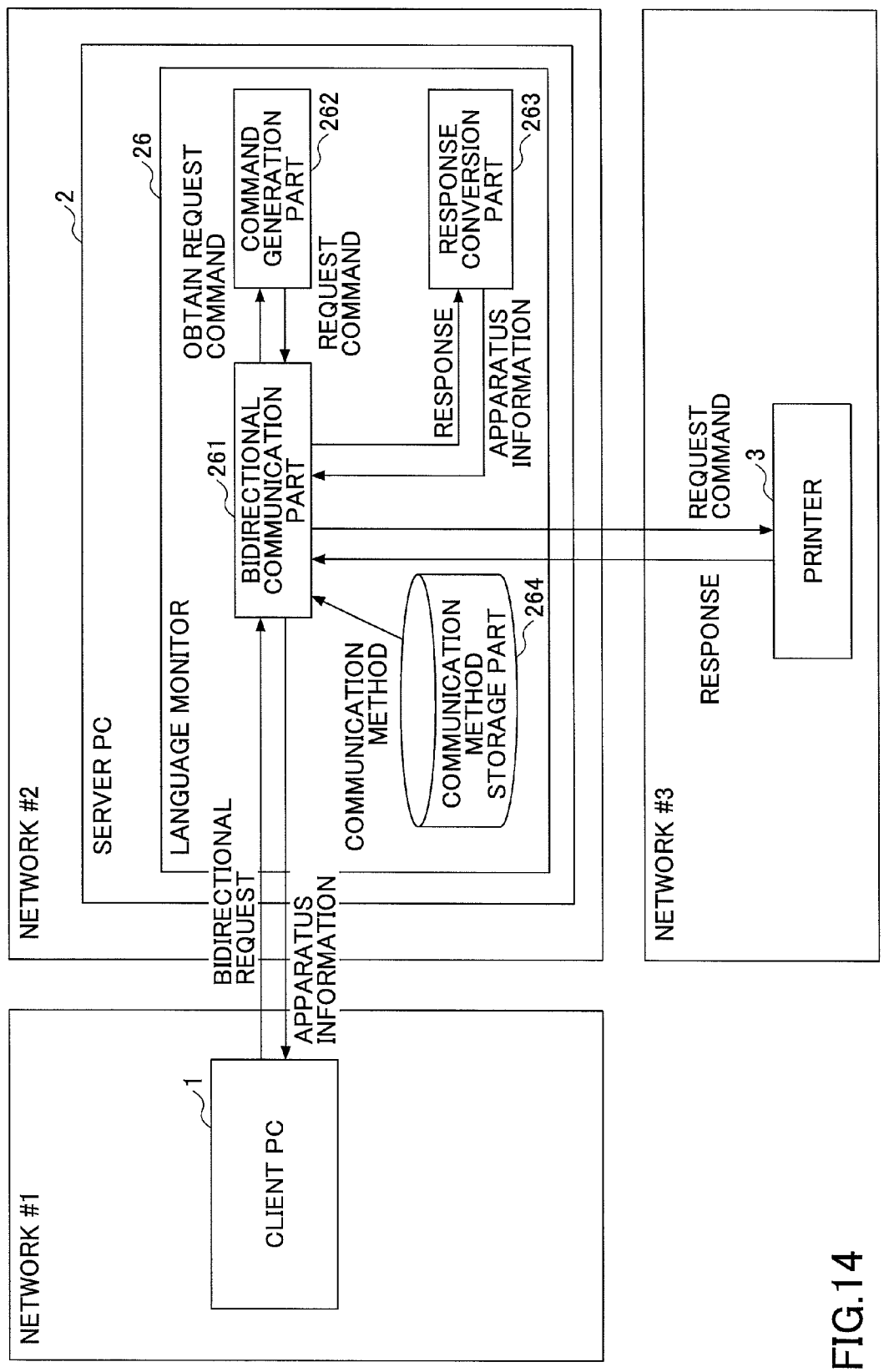
FIG. 14 shows a functional configuration example for bidirectional communication according to a third embodiment.

FIG. 14 shows a functional configuration example for carrying out bidirectional communication according to a third embodiment.

There are several communication methods (protocols) for bidirectional communication with a printer, and the communication methods are determined for respective printer ports. For example, communication is carried out by SNMP in a case of using TCP/IP ports, communication is carried out by PJL in a case of using USB ports, and so forth.

However, depending on a user, there may be a case where a user wishes to prevent a specific protocol from being used with concern for security or the like. For example, a user may wish to prohibit SNMP.

According to the third embodiment, a user can designate a communication method to be used for obtaining apparatus information so that the user's requirements can be satisfied.

In FIG. 14, in addition to the configuration of FIG. 5, a communication method storage part 264 that stores a communication method that has been designated by a user is provided in the language monitor 26 of the server PC 2. The bidirectional communication part 261 obtains the communication method from the communication method storage part 264 prior to carrying out bidirectional communication.

Figure 15:
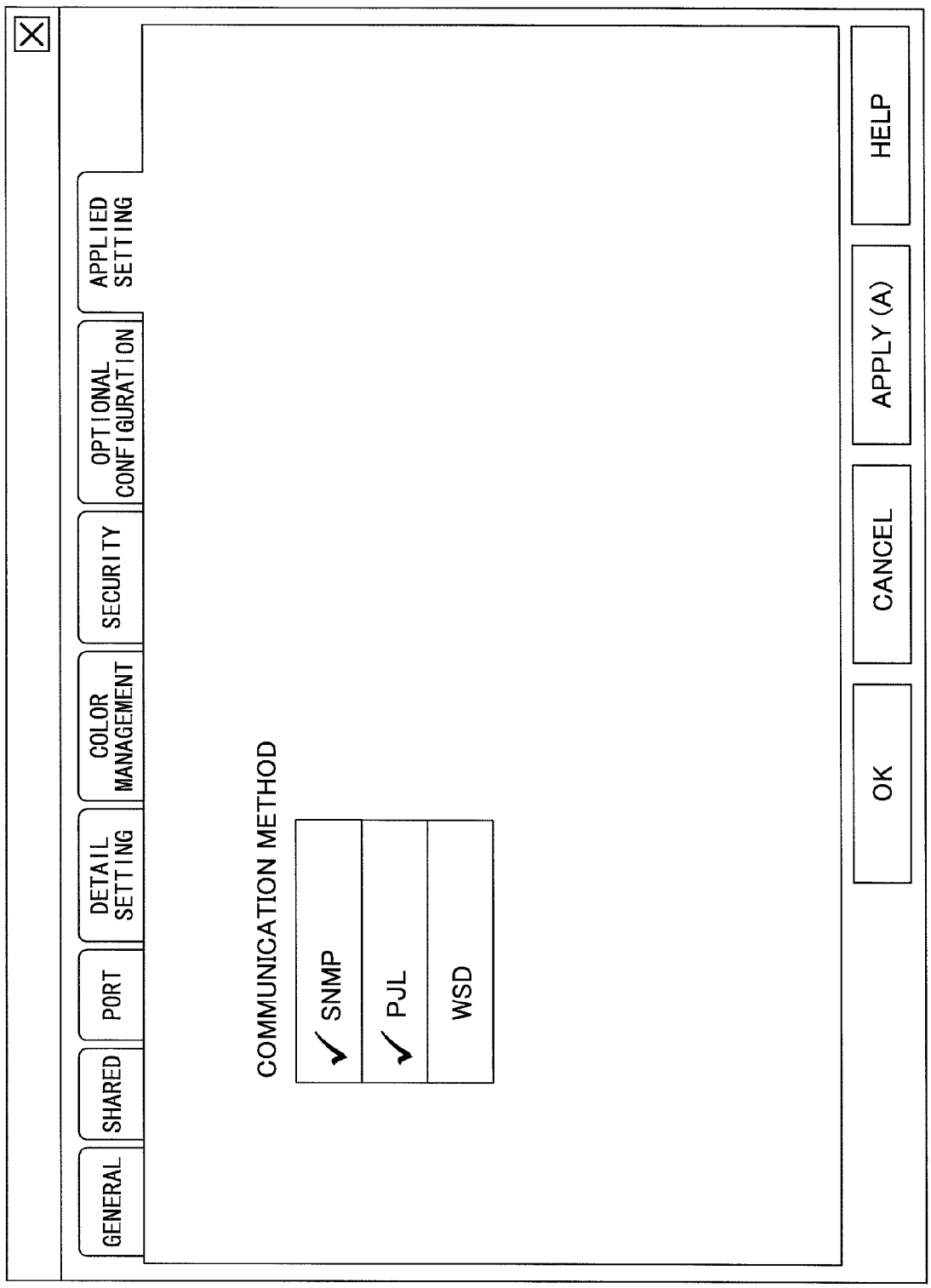
FIG. 15 shows one example of a user interface for designation of a communication method to be used for bidirectional communication.

FIG. 15 shows one example of a user interface (screen page) for a user to designate a communication method to be used for bidirectional communication. As a result of a user using a check mark to designate a communication method to be used for bidirectional communication on the user interface, designation of the communication method is carried out. It is also possible to designate at the same time a plurality of communication methods with priorities to be set therefor, respectively. In the example of FIG. 15, "SNMP" and "PJL" have been designated at the same time with respective check marks as communication methods, and "SNMP" placed above the "PJL" on the screen page has the higher priority than "PJL" accordingly. In this case, first, bidirectional communication is carried out using "SNMP" having the higher priority. Then, in a case where the communication using "SNMP" has resulted in failure, "PJL" having the subsequent priority is then used to carry out communication.

FIG. 16 is a flowchart showing a processing example of the third embodiment.

In FIG. 16, in a case where there occurs a necessity of obtaining apparatus information of the printer 3, the client PC 1 transmits a bidirectional request to the language monitor 26 of the server PC 2 (step S301).

When having received the bidirectional request, the language monitor 26 of the server PC 2 gives it to the bidirectional communication part 261 (step S302).

The bidirectional communication part 261 obtains the communication method from the communication method storage part 264 (step S303).

The bidirectional communication part 261 gives the bidirectional request to the command generation part 262, and requests it to obtain a request command (step S304). At this time, the bidirectional communication part 261 also gives the communication method obtained from the communication method storage part 264 to the command generation part 262 together with the bidirectional request.

The command generation part 262 generates a request command based on the communication method obtained from the bidirectional communication part 261, and gives the request command to the bidirectional communication part 261 (step S305).

The bidirectional communication part 261 receives the request command from the command generation part 262, transmits the request command to the printer 3, and starts bidirectional communication (step S306).

The bidirectional communication part 261 then receives a response from the printer 3, and gives it to the response conversion part 263 (step S307).

The response conversion part 263 converts the response to apparatus information that does not depend on protocols (step S308). The request command depends on the communication method obtained from the communication method storage part 264. In the same way, the response from the printer 3 also depends on the protocol. The response conversion part 263 converts the response to apparatus information that does not depend on protocols.

The bidirectional communication part 261 receives the apparatus information from the response conversion part 263, and gives it to the client PC 1 (step S309).

SUMMARY OF EMBODIMENTS

As described above, according to the embodiments, the following advantageous effects can be obtained.

(1) Even in a case where direct communication between the client PC 1 and the printer 3 is restricted, the client PC 1 can obtain apparatus information of the printer 3 without regard to the connection type between the server PC 2 and the printer 3.

(2) In a case where a communication method is designated by a user, control is made such that bidirectional communication between the server PC 2 and the printer 3 is carried out using the designated communication method, and thus, it is possible to carry out operation in consideration of security.

(3) In a case where direct communication between the client PC 1 and the printer 3 is allowed to carry out, it is possible to actually carry out direct communication between the client PC 1 and the printer 3.

Although the print processing system and the information processing apparatus have been described by the embodiments, the present invention is not limited to the specifically disclosed embodiments, and variations and modifications may be made without departing from the scope of the present invention.

The present application is based on and claims the benefit of priority of Japanese Priority Application No. 2012-153979 filed on Jul. 9, 2012 and Japanese Priority Application No. 2013-081907 filed on Apr. 10, 2013, the entire contents of which are hereby incorporated herein by reference.

What is claimed is:

1. A print processing system comprising:
a first information processing apparatus; and
a second information processing apparatus connected to the first information processing apparatus through a network, wherein
the first information processing apparatus includes: a first bidirectional communication part that carries out bidirectional communication with the second information processing apparatus and an image processing apparatus;
a first command generation part that generates, based on a request received by the first bidirectional communication part from the second information processing apparatus, a request command to be transmitted to the image processing apparatus, depending on a print protocol of the image processing apparatus;
a first response conversion part that converts a response that corresponds to the request command and has been received by the first bidirectional communication part from the image processing apparatus, into a response that is to be transmitted to the second information processing apparatus and has a form that does not depend on print protocols; and wherein
the second information processing apparatus includes:
a second bidirectional communication part that carries out bidirectional communication with the image processing apparatus;
a second command generation part that generates, based on a request received by the second bidirectional communication part, a request command to be transmitted to the image processing apparatus, depending on a print protocol of the image processing apparatus;
a second response conversion part that converts a response that corresponds to the request command and has been received by the second bidirectional communication part from the image processing apparatus, into a response that is to be transmitted to the second information processing apparatus and has a form that does not depend on print protocols;
a switching part that determines based on a switching setting whether the second information processing apparatus carries out bidirectional communication with the image processing apparatus, requests the second bidirectional communication part to carry out bidirectional communication when the switching part determines that the second information processing apparatus carries out bidirectional communication with the image processing apparatus and requests the first bidirectional communication part to carry out bidirectional communication when the switching part does not determine that the second information processing apparatus carries out bidirectional communication with the image processing apparatus; and
a user interface to be used by a user to make the switching setting.

2. The print processing system as claimed in claim 1, wherein the user interface is configured to be used by a user to designate a communication method corresponding to the print protocol of the image processing apparatus.

3. The print processing apparatus as claimed in claim 2, wherein
the user interface is one by which it is possible to designate a plurality of communication methods, and also, it is possible to set priorities to the communication methods, and
bidirectional communication is carried out using one of the communication methods which has a higher one of the priorities, and, in a case where the bidirectional communication has failed, bidirectional communication is carried out using another one of the communication methods which has a next higher one of the priorities.

* * * * *